United States Patent
Tsuchiya et al.

(10) Patent No.: US 6,676,867 B2
(45) Date of Patent: Jan. 13, 2004

(54) RESIN AND GAS INJECTION MOLDING METHOD WITH SUBSEQUENT COHERING

(75) Inventors: Atsushi Tsuchiya, Fukushima (JP); Hirofumi Tateyama, Fukushima (JP)

(73) Assignee: Tohoku Munekata Co., LTD, Fukushimaken (JP)

( * ) Notice: Subject to any disclaimer, the term of this patent is extended or adjusted under 35 U.S.C. 154(b) by 58 days.

(21) Appl. No.: 09/928,282

(22) Filed: Aug. 10, 2001

(65) Prior Publication Data

US 2002/0038920 A1 Apr. 4, 2002

(30) Foreign Application Priority Data

Aug. 11, 2000 (JP) ........................................ 2000-244610

(51) Int. Cl.[7] ............................. B29C 45/34; B29C 45/57
(52) U.S. Cl. ........................................... 264/83; 264/572
(58) Field of Search ............................. 264/83, 82, 572, 264/328.1

(56) References Cited

U.S. PATENT DOCUMENTS

| | | | | |
|---|---|---|---|---|
| 3,044,118 A | * | 7/1962 | Bernhardt et al. | 264/65 |
| 4,164,523 A | * | 8/1979 | Hanning | 264/28 |
| 5,344,596 A | * | 9/1994 | Hendry | 264/40.3 |
| 5,643,527 A | * | 7/1997 | Carroll | 264/500 |
| 5,902,541 A | * | 5/1999 | Imai et al. | 264/572 |
| 6,294,126 B1 | * | 9/2001 | Eckardt et al. | 264/500 |
| 6,337,039 B1 | * | 1/2002 | Yamaki et al. | 264/1.33 |

FOREIGN PATENT DOCUMENTS

| JP | 10-320848 | * 12/1998 |
|---|---|---|
| JP | 11-179750 | * 7/1999 |

* cited by examiner

Primary Examiner—Jill L. Heitbrink
(74) Attorney, Agent, or Firm—McGlew and Tuttle, P.C.

(57) ABSTRACT

The present invention provides an injection molding method for providing a molded product with excellent transcription and an excellent gloss level. In this method, immediately after a resin is filled in a cavity (1), a carbon dioxide gas is injected or the skin layer is moved back to form a space (13) between the resin and the die surface (1), so that growth of the skin layer is hold down, and at the same time the carbon dioxide is dissolved in the skin layer for lowering the glass transition point of skin layer. Then the skin layer is again closely cohered to a surface of the die by increasing the resin pressure and cooling the molded product for solidifying behind the holding pressure. With this method, products with excellent transcription and with an excellent surface gloss level can be obtained.

19 Claims, 3 Drawing Sheets

(A)　　　　　(B)　　　　　(C)

(A)

(B)

(A)

(B)

RESIN AND GAS INJECTION MOLDING METHOD WITH SUBSEQUENT COHERING

FIELD OF THE INVENTION

The present invention relates to an injection molding method. More specifically, this invention relates to an injection molding method carried out by dissolving a carbon dioxide gas or a molding method for improving the transcription of products from a die surface or surfaces as well as improvinng a gloss level of the surface or surfaces of molded products.

BACKGROUND OF THE INVENTION

In injection molding of thermoplastics resin, generally, melted resin is filled in a cavity of a die, and the resin is cooled in the die to obtain molded products having the same form as the cavity. In this injection molding process, as a die is maintained at a lower temperature than the solidifying temperature of the resin. When the melted resin is filled in the cavity of die, freezing of the resin starts and proceeds immediately, and the so-called skin layer, which is a layer subjected to freezing, is formed on the surface of melted resin. Especially, a flow tip of the melted resin is transferred onto a surface of the molded product because of the flow of the melted resin like a fountain, and also in this portion, freezing proceeds and the resin is pressed to the die surface with a low pressure. The results inlude such troubles as transcription defects of the molded product, non-uniformity in flow due to the progress in freezing of the resin, and molding defects arise such as when jetting may occur. To evade the occurrence of such problems as described above, in the conventional technology, a temperature for melting a resin and a temperature of a die are set to higher values to prevent the resin from being solidified and also to improve the transcription.

With this method, however, the transcription is improved, but sink mark and warpage easily occur due to non-uniformity in solidifying and shrinkage of the resin. As such, it is difficult to control the molding process advantageously. In addition, the molding cycle time becomes longer, which results in economical problems such as the higher cost of the molded product.

To solve the problems described above, there has been proposed a method of temporally heating a surface of a die and controling the solidifying of melted resin by making use of a heater, heated oil, heated water, or a heat of the melted resin itself in the injection molding process. With this method, however, the transcription improved, but a specific facility is required, and also the molding cycle time becomes longer, which is economically disadvantageous.

As a method capable of overcoming the problems as described above and also of improving the transcription, Japanese Patent Laid-Open Publication No. HEI 10-128783 proposes an injection molding method. In this injection molding process, before a resin is filled in a cavity of a die, an inactive gas such as a carbon dioxide gas is filled in the cavity and then injected with thermoplastic resin. With this method, however, the resin flows while the inactive gas such as a carbon dioxide gas is dissolved in the resin. This results in flow that is unstable, and sometimes the surface of the molded product may have a defect because of not-uniform flow of the resin and non-uniformity in the flow rate of the resin. Further as a resin is filled in a pressurized cavity space, sometimes insufficient filling may occur in the molded product. It is difficult to control over gas exhausting.

SUMMARY AND OBJECTS OF THE INVENTION

It is an object of the invention to provide an injection molding method that does not cause cosmetic defects and insures an improved transcription and gloss level of products, a reduction of weld lines, and also a reduction of defects such as a flow marks of the resin and a gas marks caused in gas injection molding.

According to the invention, a process of injection molding is provided which improves the surface transcription, gloss level and cosmetic appearance of molded products. The resin is filled into the cavity of a die to form a space between a resin surface and a die surface as to the the visible side of the product(s) to hold down the progress of surface freezing of the melted resin. Into the space fluid is injected which softens the surface of injected resin (skin layer). Subsequently, pressure of the resin in the cavity is increased by adding a holding pressure in order to cohere the resin to the surface of the die. The resin is then cooled down in the cavity of the die until the resin solidifies.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
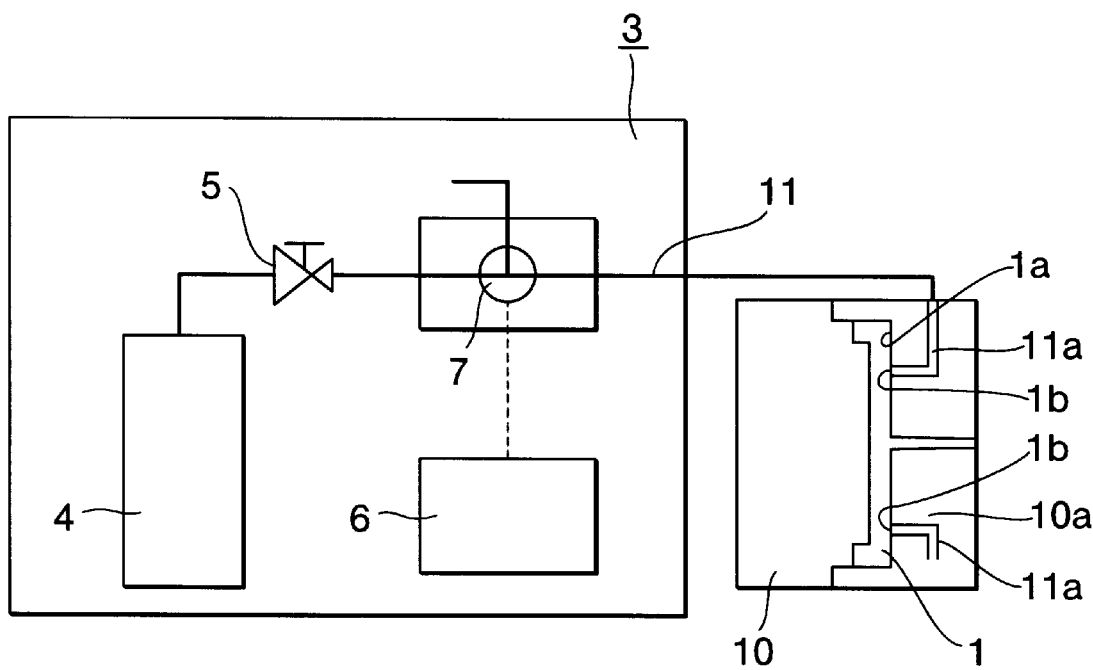
FIG. 1 is an explanatory view showing a gas injection device and a die for carrying out the present invention.

Referring to the drawings in particular, the injection molding method according to the present invention comprises forcefully forming a space between the melted resin and the die surface in the visible side of molded products visible immediately after the resin is filled in. A fluid capable of softening the skin layer such as a carbon dioxide gas is injected, or the space is formed while the gas is being injected. With this process, the glass transition point of the skin layer is lowered by dissolving the fluid into the skin layer formed on a visible surface of the molded product while compressing the space portion. Then the skin layer is again pressed to the die surface and is solidified behind a holding pressure process. As described above, the transcription, gloss level, and cosmetic appearance of the molded products can be improved without affecting fluidity of a resin by forming the space immediately after the resin is filled in. Then a fluid is injected for softening the skin layer into this space, and again adding or applying a pressure to the skin layer for molding. Further, by injecting a fluid with continuous increased pressure or step by step increased pressure, no adverse effect is given to the skin layer immediately after the resin is filled in, even if the fluid is finally injected under a high pressure. Alternatively, the space can gradually be formed between the die surface and a skin layer immediately after a resin is filled in. The space may be formed either by partially and finely moving to the back a movable side die or a surface of the fixed side die opposite to the visible surface and at the same time injecting a fluid into the space, or by injecting a fluid after moving to the back is stopped and a space between the resin and die surface is formed.

The thermoplastic resins used in this invention include, for instance, styrene-based resins (such as polystyrene, butadiene/styrene copolymer, acrylonitrile/styrene copolymer, acrylonitrile/butadiene/styrene copolymer), ABS resin, polyethylene, polypropyrene, ethylene/propylene resin, ethylene-ethylacrylate resin, polyvinyl chloride, polyvinyliden chloride, polybutene, polycarbonate, polyacetal, polyphenylene oxide, polyvinyl alcohol, polymethyl methacrylate, saturated polyester resins (such as polyethylene telephthalate, polybutylene telephthalate), viodegradable polyester resins (such as hydroxycarboxylic acid condensate, condensates of diol and dicarboxylic acid such as polybutylene succinate), polyamide resin, polyimide resin, fluorine resin, polysulphone, polyether sulphone, polyacrylate, polyether etherketone, a mixture of one or more types of crystalline liquid polymer, and a resin in which various types of inorganic or organic fillers are mixed. Of these thermoplastic resins, styrene-based resins and ABS resin are especially preferable.

Any type of gas may be used in the present invention provided that the gas is dissolved in a resin, but a carbon dioxide gas having the high solubility for resin or a carbon dioxide gas in the supercritical state is preferable. Not only a gas, but a liquid may be used on the condition that the liquid shows the same effect as a carbon dioxide gas.

EXAMPLE 1

Embodiments of the present invention and controls thereto are described in detail below with reference to the related drawings, but it should be noted that the present invention is not limited to these examples and that a combination of the examples is also included within a scope of the present invention.

FIG. 1 shows a die and a carbon dioxide injector each for carrying out the present invention. The reference numeral 1 indicates a die cavity formed by assembling a fixed side die 10 and a movable side die 10a into a die, while the reference numeral 3 indicates a gas injector, and the gas injector 3 comprises a gas tank 4 with a carbon dioxide gas filled therein, a gas injection line 11 connected to a gas injection circuit 11a at each of two gas injection inlets ports 1b formed with the gas tank 4 and the movable side die 10a on a die surface 1a in the visible surface side 1a, a gas pressure adjuster 5 attached to this gas injection line 11, a electromagnetic switching control valve 7, and a control unit 6 for controlling this control valve 7.

Figure 2:
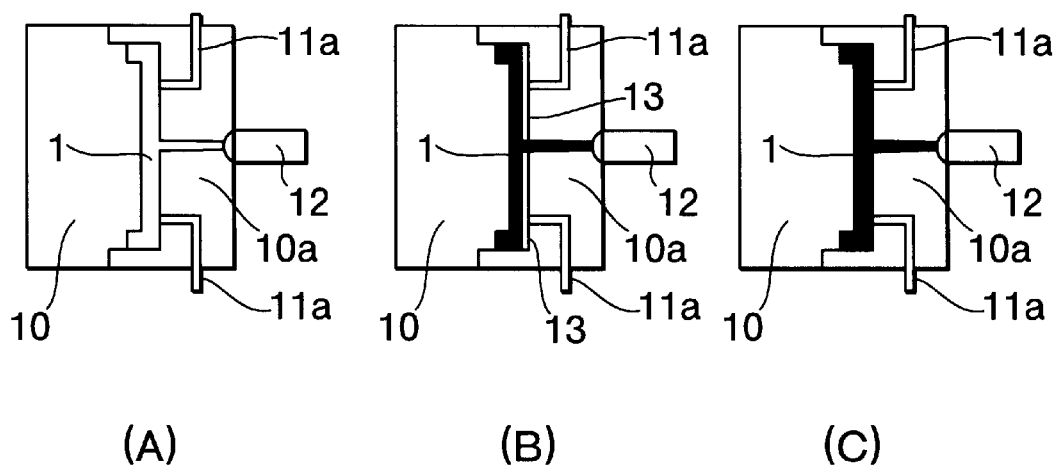
FIG. 2A is an explanatory view of an embodiment of the present invention showing a stage in which a space is formed by gas injection pressure according to the present invention.
FIG. 2B is an explanatory view of an embodiment of the present invention showing another stage in which a space is formed by gas injection pressure according to the present invention.
FIG. 2C is an explanatory view of an embodiment of the present invention showing another stage following the formation of the space by gas injection pressure according to the present invention.

Next, the injection molding method according to the present invention is described with reference to FIGS. 2(A), (B), and (C).

Figure 3:
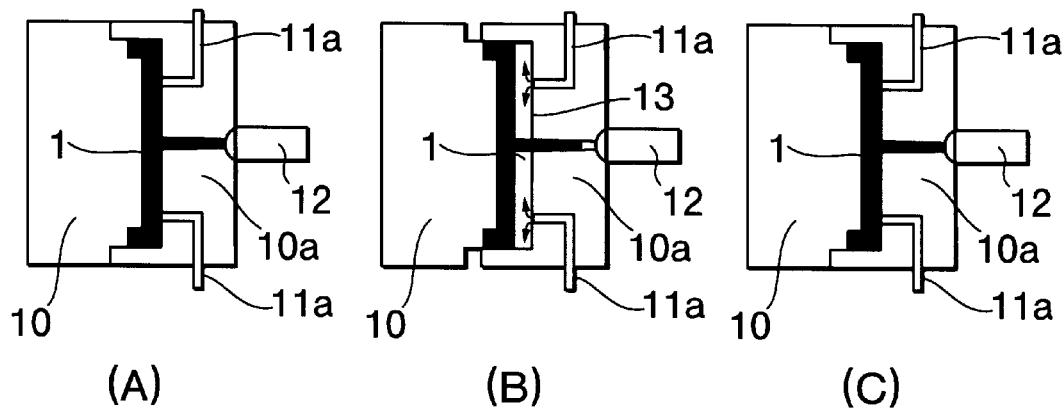
FIG. 3A is an explanatory view of an embodiment of the present invention showing a stage in which the space is formed by moving a die to the back according to the present invention.
FIG. 3B is an explanatory view of an embodiment of the present invention showing another stage in which the space is formed by moving a die to the back according to the present invention.
FIG. 3C is an explanatory view of an embodiment of the present invention showing another stage following the formation of the space by moving a die to the back according to the present invention.

The gas injector 3 shown in FIG. 1 is a product used according to the invention, and the molding machine (Nihon Seikosho K.K; J220E2-P-2M) with the clamping pressure of 220 t was used as the injection molding machine. The used resin was high impact polystyrene (Idemitsu Petrochemicals; HT560). The molded product had the size of 164 mm (length)×74 mm (width)×2.5 mm (thickness), and further the molded product had a plate-like form with a boss and rib formed on the not-visible surface. A melted resin for molding was filled in the cavity of the die under the conditions of the injection pressure of 56 MPa, filling time of 0.6 sec, and the melted resin's temperature of 230° C., and the temperature of the die cavity 1 (made of S45C) was set with chilled water to 18° C. After the melted resin was filled, the carbon dioxide gas was injected from the gas injection inlet 1a into a space between the visible skin surface and a die surface 1a cohering it, then the space 13 is compressed by moving a barrel 12 forward to increase the resin pressure. Subsequently, the visible skin surface was again pressed closely to the die surface 1a for holding by dissolving the carbon dioxide gas in the skin surface to lower the glass transition point of the skin surface, and a holding pressure was added to the resin (FIG. 2C). On the other hand, FIGS. 3(A) to (C) shows a different molding method. According to this example of the invention, immediately after the melted resin was filled in the cavity, the movable side die 10a was moved to the back to release the clamping pressure to the die, while the space 13 with the thickness of about 0.1 mm was forcefully formed between the skin layer on the visible surface and the die surface 1a (B), and then the carbon dioxide gas with the pressure set to 6.5 MPa was continuously injected from 1b for 2.0 sec. Then the movable side die 10a was moved forward for clamping. A holding pressure of 90 MPa was added (applided) for 7 second, and the carbon dioxide gas was dissolved in the skin surface compressing the space 13 to lower the glass transition point of the skin layer surface, and the skin layer again closely cohered to the die surface for molding (FIG. 3C).

The carbon dioxide gas not having been dissolved in the skin layer is exhausted via a path that is reversed to that for injection to the gas injector side 3.

The molded product obtained as described above had excellent transcription and the result of measurement of the gloss level of the surface of the product with the Gloss Checker (produced by HORIBA Ltd.; IG-310) is shown in Table 1.

EXAMPLE 2

This example corresponds to another variant according to the invention. Molding as performed in the completely same way as that in Example 1 excluding the point that the carbon dioxide gas was continuously or intermittently injected into the space 13 formed. The total time consumed for injecting the gas was 2.0 sec, while exhaustion was executed for 0.2 sec, and in the case where gas injection was performed intermittently, the operation was divided to four stages, and an equal quantity of gas was injected in each stage. As a result, the molded product obtained as described above had excellent transcription, and had an excellent surface glossy level. The result of measurement of surface gloss level of the molded product is shown in Table 1.

Control 1

Molding was performed in the completely same way excluding the step relating to gas injection, which was not carried out. As a result, the molded product obtained as described had poor transcription qualities as compared to that in Example 1, and it was also confirmed that the gloss level of the molded product was inferior to that obtained in Example 1. The result of measurement of the gloss level of the molded product is shown in table 1.

EXAMPLE 3

This example is yet another varient of the invention. Molding was performed in the completely same way excluding the point that, immediately after the melted resin was filled in, the surface of the fixed side die contacting visible side of the products was moved to the back to form the space 13 with the thickness of about 0.1 mm between the resin and the die surface, the carbon dioxide gas was injected into this space 13 like in Example 1, and then after the carbon dioxide gas was dissolved only in the resin surface (visible skin surface) of the visible side of the product, the die surface moved to the back was again moved forward, and then a further holding pressure was applied. The result of measurement of the gloss level of the molded product is shown in Table 1.

Control 2

Molding was performed in the completely same way as that in Example 2 excluding the step of injection of carbon dioxide gas, which was not carried out. As a result, it was confirmed that the molded product obtained as described above has an inferior gloss level compared to that of the molded product in Example 2. The result of measurement of the gloss level of the molded product is shown in Table 1.

EXAMPLE 4

Molding was performed in the completely same way as in Example 1 excluding the point that a gas injection inlet was provided at one place. It was confirmed that the molded product obtained as described above had excellent transcription qualities and an excellent surface gloss level of the molded product. The result of measurement of the surface gloss level of the molded product is shown in Table 1.

TABLE 1

| | Method for forming the space | Type of gas | Gas pressure | Gas inlet | Gloss level |
|---|---|---|---|---|---|
| Example 1 | Gas pressure | carbon dioxide | Constant | 2 places | 84 |
| Example 2 | Gas pressure | carbon dioxide | Intermittent | 2 places | 86 |
| Example 3 | Moving to the back die surface | carbon dioxide | Constant | 2 places | 86 |
| Example 4 | Gas pressure | carbon dioxide | Constant | 1 place | 85 |
| Control 1 | | | | | 23 |
| Control 2 | | | | | 23 |

Figure 4:
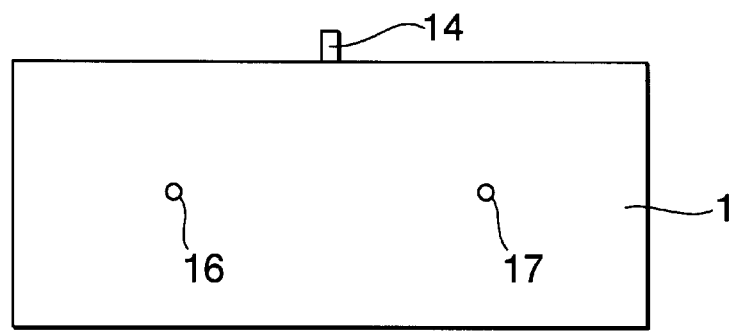
FIG. 4A is an explanatory view showing a molded product obtained by injecting a gas from two positions.
FIG. 4B is another explanatory view showing a molded product obtained by injecting a gas from two positions.
Figure 4:
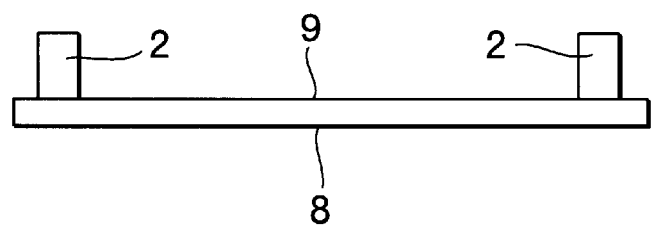
Figure 5:
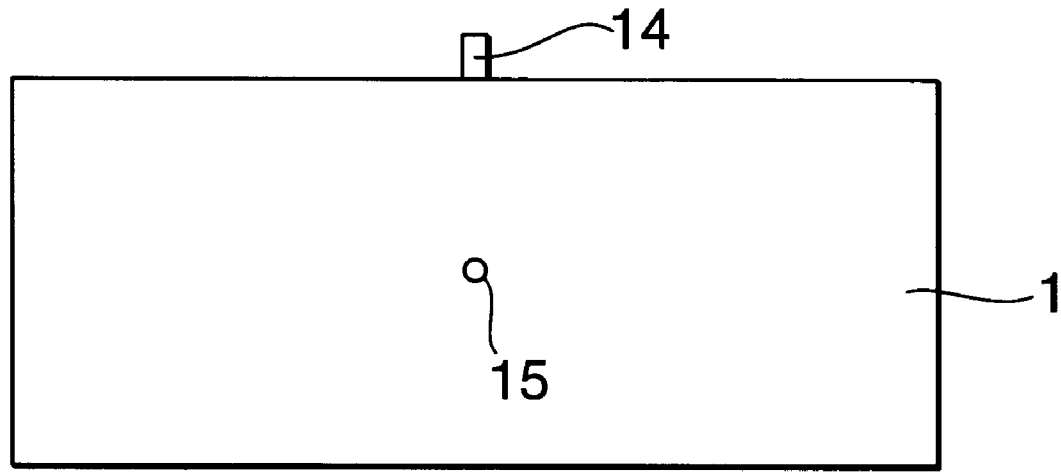
FIG. 5A is an explanatory view showing a molded product obtained by injecting a gas from a one position.
FIG. 5B is another explanatory view showing molded products obtained by injecting a gas from one position.
Figure 5:
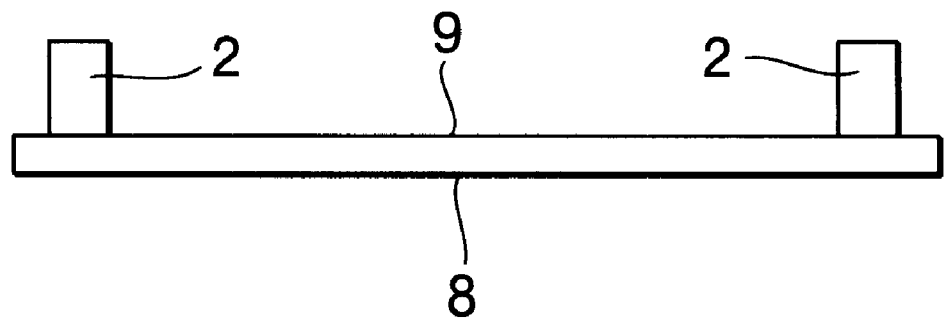

FIG. 4 and FIG. 5 shows the molded products obtained in the examples described above. In these figures, designated at the reference numeral 8 is a visible surface of the molded product, at 9 a not-visible surface thereof, at 14 a gate position in the molded product, at 15 a position of the inlet 1b when the gas is injected from one place, and at the reference numerals 16 and 17 positions of the inlets when gas is injected from two places.

With the invention as described in claims 1 to 6, immediately after a resin is filled in a die cavity, a space is formed between a surface of a die in the visible surface side and the resin. A fluid is dissolved only in a resin surface in the visible surface side of the product. A holding pressure is then added, then the residual fluid is exhausted, the fluid not having been dissolved in the resin. The softening surface of resin, with the fluid having been dissolved therein, is pressed to the die surface in the visible side of the product, thus molded products with excellent transcription, appearance and gloss level are obtained.

By forming a space between the resin filled in a die cavity and the die surface, there are provided the advantages that the resin is thermally insulated and that the resin can be kept at a high temperature until transcription to die surface is performed again by adding the holding pressure. Further by adding the holding pressure, a fluid filled in the space such as carbon dioxide is dissolved in the resin and the viscosity of a surface of resin is lowered, so that only molded products with excellent transcription on the visible surface thereof can be obtained. Further by moving a portion of a die forward or backward, the transcription of the molded products can be improved partially. In addition, it is possible to reduce weld lines generated at a joint between flowing resins or such defects as a flow mark and a gas mark.

While specific embodiments of the invention have been shown and described in detail to illustrate the application of the principles of the invention, it will be understood that the invention may be embodied otherwise without departing from such principles.

DESCRIPTION OF THE REFERENCE CHARACTERS

1: Molded plastic product
2: Boss section
3: Gas injector
4: High pressure gas generator or a gas tank
5: Gas pressure adjuster
6: Control unit
7: Electromagnetic control valve
8: Visible surface side of molded products
9: Not-visible surface side of the molded product
10: Die for molding
11: Gas injection line
12: Barrel of a molding machine
13: space
14: Gate position in the molded product
15: Gas injection position into a die cavity
16: Gas injection position into a die cavity
17: Gas injection position into a die cavity

What is claimed is:

1. An injection molding process of for improving surface transcription, gloss level and cosmetic appearance of a resulting molded product, the process comprising the steps of:

filling resin into a cavity of a die and after said resin is filled into said cavity forming a space between an injection resin surface and a die surface on a product visible side to hold down progression of surface freezing of the melted resin;

injecting gas into the space and softening the injected resin surface on a product visible side;

subsequently increasing the pressure of the resin in the cavity adding a holding pressure and cohering the resin to said die surface on the product visible side; and cooling down the resin in the cavity of the die until the resin solidifies.

2. An injection molding process according to claim 1, wherein subsequently to filling resin into the cavity, gas is injected with continuously increased pressure or step by step gradationally increased pressure.

3. An injection molding process according to claim 1, wherein after the resin is filled into the cavity, gas is injected from several inlets.

4. An injection molding process according to claim 1, wherein after resin is filled into the cavity the space is formed by injecting gas.

5. An injection molding process according to claim 1, wherein after resin is filled into the cavity, the space is formed by moving a movable side of the die or opposite side to visible surface of molded product of the die.

6. An injection molding process according to claim 1, wherein the gas injected is carbon dioxide.

7. A method for producing an injection molded product, the method comprising:

filling resin into a cavity of a die and after said resin is filled into said cavity forming a space between an injected resin a product visible side surface and a die surface;

injecting gas into said space;

subsequently increasing the pressure of the resin in the cavity;

cohering the resin product visible side surface to the surface of the die; and cooling down the resin in the cavity of the die until the resin solidifies.

8. Method according to claim 7, wherein subsequently to filling resin into the cavity, gas is injected with continuously increased pressure or step by step gradationally increased pressure.

9. Method according to claim 7, wherein after the resin is filled into the cavity, gas is injected from several inlets.

10. Method according to claim 7, wherein after resin is filled into the cavity the space is formed by injecting gas.

11. Method according to claim 7, wherein after resin is filled into the cavity, the space is formed by moving a movable side of the die or opposite side to visible surface of molded product of the die.

12. Method according to claim 7, wherein the gas injected is carbon dioxide.

13. A method for producing an injection molded product, the method comprising:

providing a first and second die defining a cavity, said first die defining a first surface of said cavity, said second die defining a second surface of said cavity;

filling resin into said cavity;

forming a space between said resin in said cavity and said first surface of said cavity;

injecting gas into said space;

moving said resin and said first surface into contact with each other;

cooling said resin in said cavity until said resin solidifies to form the molded product.

14. A method in accordance with claim 13, further comprising:

increasing a pressure of said resin in said cavity after said step of injecting gas into said space.

15. A method in accordance with claim 13, wherein:

the molded product has a more visible side and a less visible side;

said first surface of said cavity forms said more visible side of the molded product.

16. A method in accordance with claim 13, wherein:

said space is fanned by said injecting of said gas.

17. A method in accordance with claim 13, wherein:

said space is formed by moving one of said dies with respect to the other of said dies.

18. A method in accordance with claim 17 wherein;

said space is formed before said injecting of said gas.

19. A method in accordance with claim 13, wherein:

said cooling is performed while said first surface is in contact with said resin.

* * * * *